United States Patent [19]

Tomiyama

[11] Patent Number: 5,196,859
[45] Date of Patent: Mar. 23, 1993

[54] PICTURE PROCESSING SYSTEM

[75] Inventor: Susumu Tomiyama, Kanagawa, Japan

[73] Assignee: Fuji Photo Film Co., Ltd., Kanagawa, Japan

[21] Appl. No.: 748,125

[22] Filed: Aug. 21, 1991

[30] Foreign Application Priority Data

Sep. 12, 1990 [JP] Japan ................... 2-241901

[51] Int. Cl.⁵ .................... G11B 9/00; G03B 17/24
[52] U.S. Cl. ..................... 346/74.5; 354/109
[58] Field of Search ............... 354/105, 109; 346/74.2

[56] References Cited

U.S. PATENT DOCUMENTS

| | | | |
|---|---|---|---|
| 4,340,286 | 7/1982 | Carr | 354/105 |
| 4,659,213 | 4/1987 | Matsumoto | 355/38 |
| 4,811,042 | 3/1989 | Cloutier et al. | 354/105 X |
| 4,841,340 | 6/1989 | Tokuda | 355/38 |
| 4,843,418 | 6/1989 | Taniguchi et al. | 354/106 X |
| 4,862,200 | 8/1989 | Hicks | 354/105 X |

Primary Examiner—George H. Miller, Jr.
Attorney, Agent, or Firm—Sughrue, Mion, Zinn, Macpeak & Seas

[57] ABSTRACT

A picture processing system for printing an image recorded on a negative film onto a photographic paper having a magnetic recording portion includes a write head for writing information corresponding to an image printed on said photographic paper onto a photographic paper into the magnetic recording portion, a read head for reading the information stored within the magnetic recording portion and a matching unit for matching the image printed on the photographic paper and the image of the negative film based on the information read by the read head. In consequence, in order to perform a subsequent operation on the photographic paper printed with the image, it is not necessary to convey a punched tape or the like containing the information in synchronism with this photographic paper.

18 Claims, 10 Drawing Sheets

PICTURE PROCESSING SYSTEM

BACKGROUND OF THE INVENTION a) Field of the invention

The present invention relates to a picture processing system for printing an image onto a photographic paper in which a magnetic recording portion is provided.

b) Description of the Related Art

In a picture processing system, a photographic paper printed with an image of a negative film in the printing process is subjected to a developing, fixing, rinsing and drying operation respectively in each developing, fixing, rinsing and drying process and, thereafter, the workmanship of the image is inspected in the inspection process. The images which are bad and are determined to be unacceptable are reprinted by changing the printing condition in the reprinting process. Meanwhile, the photographic paper recording the images which have passed the test is cut for each frame and, after it is determined in the matching process whether it corresponds to the negative film or not, it is stuffed into a bag for each order (for each customer) together with the negative film to be shipped.

In addition, according to the above-described picture processing system, various kinds of information are transmitted between the above-described processes. For example, the customer information of the image printed on the photographic paper in the printing process is transmitted to the matching process where, based on this information, matching of the photographic paper with the negative film is conducted. In addition, if there are any images determined to be unacceptable in the above-described inspection, then correction information representing how to correct the printing condition of the same image is transmitted to the reprinting process where, based on the above-described correction information, the previous printing condition is corrected for reprinting.

Conventionally, the information transmitted between the above-described processes is recorded by punching holes through the photographic paper or by printing signs or the like on the rear surface of the photographic paper, and the punched holes are read by a reading apparatus. Otherwise, the printed signs or the like are read by the operator in each process for transmission.

However, when the information is transmitted by printing the signs, it is necessary for the operator to judge its content by referring to the printed signs. In addition, when the photographic paper is immersed in the treating solution in the developing process and the like, the printed characters often blur and become difficult to read, which has impeded smooth communication of the information. In addition, when the information is transmitted by punching holes, since it is necessary to punch them through the non-image portion of the photographic paper, the amount of information which can be recorded thereon is limited and it is difficult to punch the holes corresponding to all the information to be transmitted. In addition, when the articles are shipped, it has been necessary to remove the punched portions.

SUMMARY OF THE INVENTION

The invention was made in view of the foregoing circumstances and it is an object of the present invention to achieve a picture processing system which allows the information to and from the processes to be transmitted smoothly and easily.

In order to achieve the above-described object, according to the present invention, there is provided a picture processing system for printing an image on a photographic paper in which a magnetic recording portion is provided comprising:

a write means for writing information about the image printed on the photographic paper into the magnetic recording portion;

a read means for reading the information stored within the magnetic recording portion; and a processing means for processing the photographic paper by using the image information read by the read means.

In addition, an image information read means for reading the image information recorded on the magnetic recording portion of the negative film is provided to print the image onto the photographic paper using the read image information.

In the present invention, using the photographic paper in which the magnetic recording portion is provided, the information about the image printed on the photographic paper is written onto the magnetic recording portion and the information is read out to perform the following operation on the photographic paper. As a result, for example, the information representing the customer for the image printed in the printing process can be stored by the magnetic recording portion of the photographic paper and, in the matching process, the information is read out to perform matching, which is the next operation. In addition, in the next processing, whether a series of photographic paper printed with the image is for the same customer or not can be determined by comparing against the information representing the image about the customer, which is stored on the adjacent magnetic recording portion. In addition, if the image printed on the photographic paper does not meet a predetermined criteria, then the correction information which is necessary for reprinting may be written onto the magnetic recording portion of that photographic paper so that by reading out the information within this magnetic recording portion, the image is printed anew onto another photographic paper.

As described above, when the information transmitted to and from the processes is magnetically recorded, it cannot happen that, in the developing process and the like, immersed in the treating solution, the information is lost, but the transmission of the information to and from the processes can be smoothly and easily conducted. In addition, since the magnetic recording portion can be also provided at a site corresponding to the image portion of the photographic paper, a great amount of information can be recorded. Still further, it is not necessary to remove the magnetic recording portion at the time of shipping.

As described above, according to the present invention, since the image information printed on the photographic paper is written onto the magnetic recording portion of the photographic paper for storing and by reading the information the photographic paper is treated, transmission of the information between the processes can be smoothed and eased.

DETAILED DESCRIPTION OF THE PREFERRED EMBODIMENTS

A specific embodiment of the present invention is described in greater detail with reference to the accompanying drawings.

Figure 1:
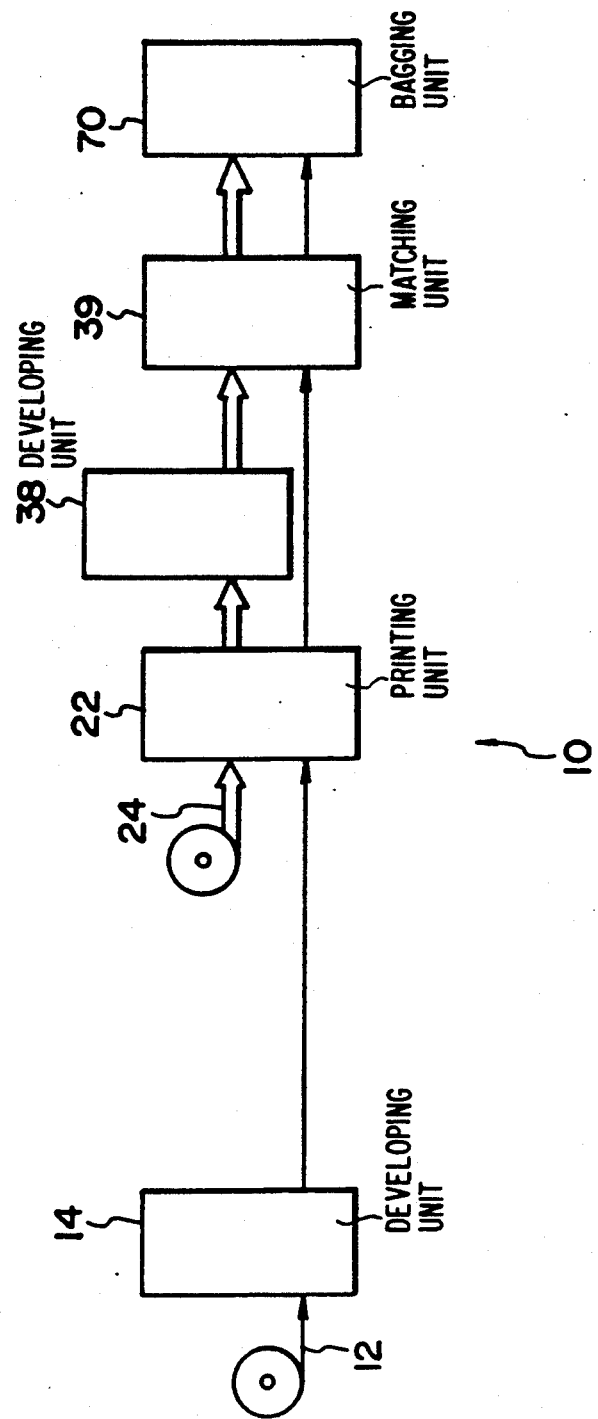
FIG. 1 is a schematic view illustrating the arrangement of a picture processing system according to the present invention.
Figure 4A:
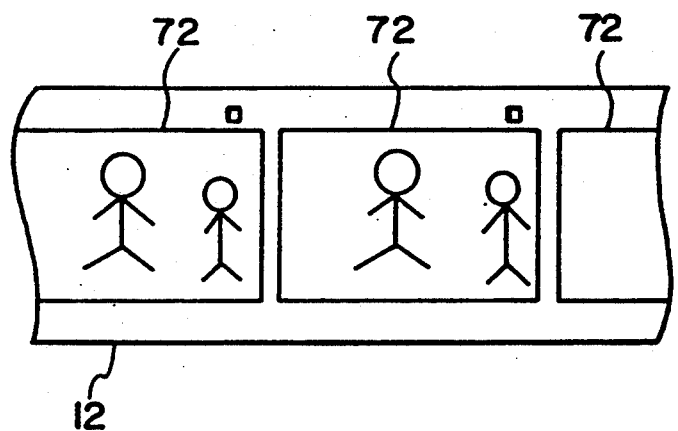
FIGS. 4A and 4B are respectively a schematic view illustrating a magnetic recording portion of a negative film.
Figure 4B:
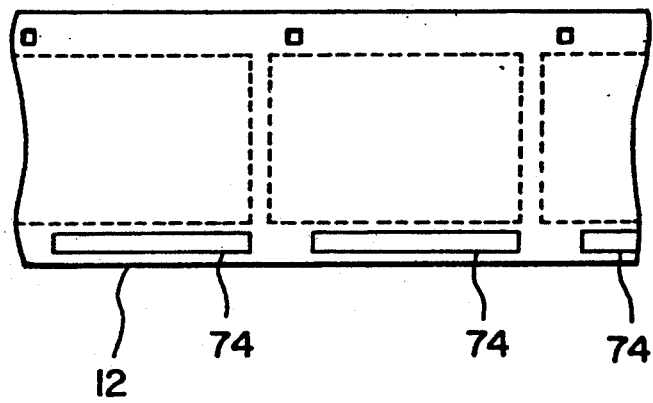

In FIG. 1, a schematic arrangement of a picture processing system 10 according to the present invention is illustrated. The picture processing apparatus 10 is provided with a developing unit, which dries a negative film 12 after it is photographed, developed, fixed and rinsed by immersion into each treating solution. This negative film 12 has a magnetic material applied on the surface opposite to the surface on which an emulsifier layer is formed. In the negative film 12 having an image 72 recorded as shown in FIG. 4A, the site corresponding to the side edge portion of the image 72 is selected to be the magnetic recording portion 74 (See FIG. 4B). In each of the magnetic recording portion 74, different information about the corresponding image, for example, the frame number applied for each image frame, the identity of the customer who ordered, photographing condition such as the kind of the light source or stop, and the like are previously stored.

Figure 2:
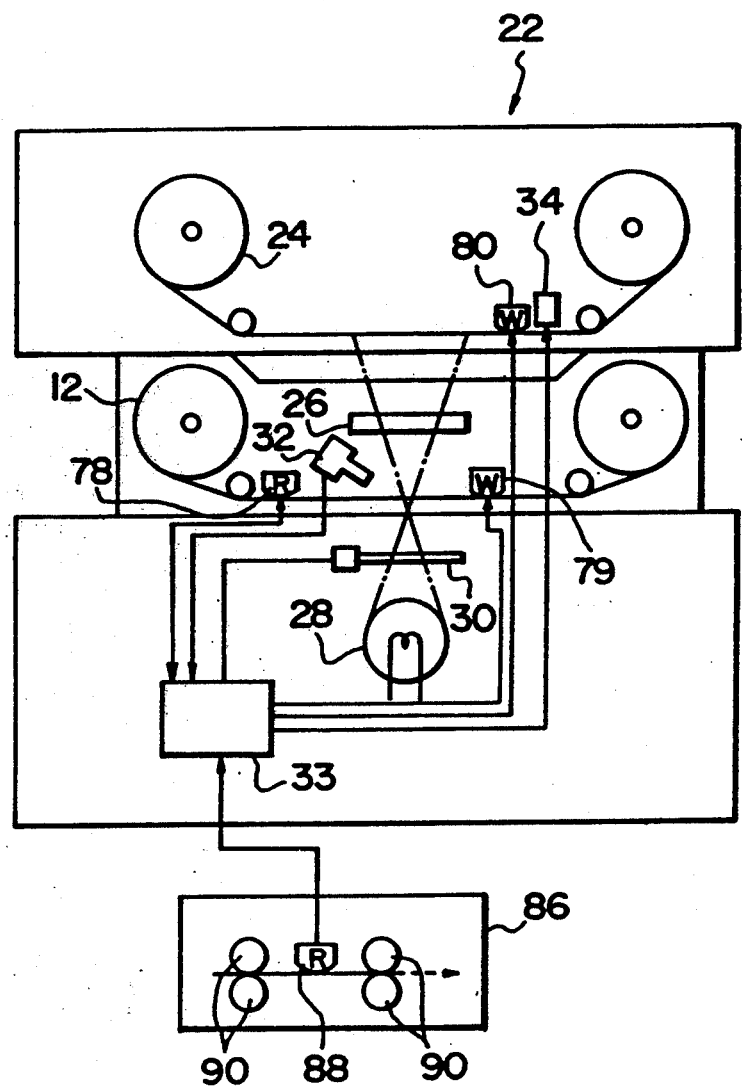
FIG. 2 is a schematic view illustrating the arrangement of a printing unit according to the present invention.

The negative film processed in the developing unit 14 is sent to a printing unit 22. As shown in FIG. 2, the printing unit 22 comprises an optical system 26 for printing the image of the negative film 12 onto the photographic paper 24 and a light source 28. In addition, a filter 30 is disposed between the negative film 12 and the light source 28 to be connected to a control circuit 33. The control circuit 33, controlling the optical system 26, light source 28 and the filter 30, prints the image recorded on the film 12 onto the photographic paper 24.

In addition, a density scanner 32 is disposed adjacent to the printing position of the negative film 12 to be connected to the above-described control circuit 33. The density scanner 32 measures the image density of the negative film 12 which lies at the printing position to output to the control circuit 33. Disposed upstream of the conveying path of the negative film 12, which lies further than the printing position of the negative film 12, is a read head 78 corresponding to the magnetic recording portion 74 of the negative film 12. The read head 78 reads the information stored within the magnetic recording portion 74. The read head 78 is connected to the control circuit 33 to output the read information to the control circuit 33. Of the information entered from the read head 78, the control circuit 33 uses the data representing a photographing condition and the image density data entered from the density scanner 32 to determine the printing condition. Disposed downstream of the printing position of the negative film 12, as viewed in the conveying direction, is a write head 79 connected to the control circuit 33. By means of this write head 79, the printing condition is stored onto the magnetic recording portion of the negative film 12.

Figure 5:
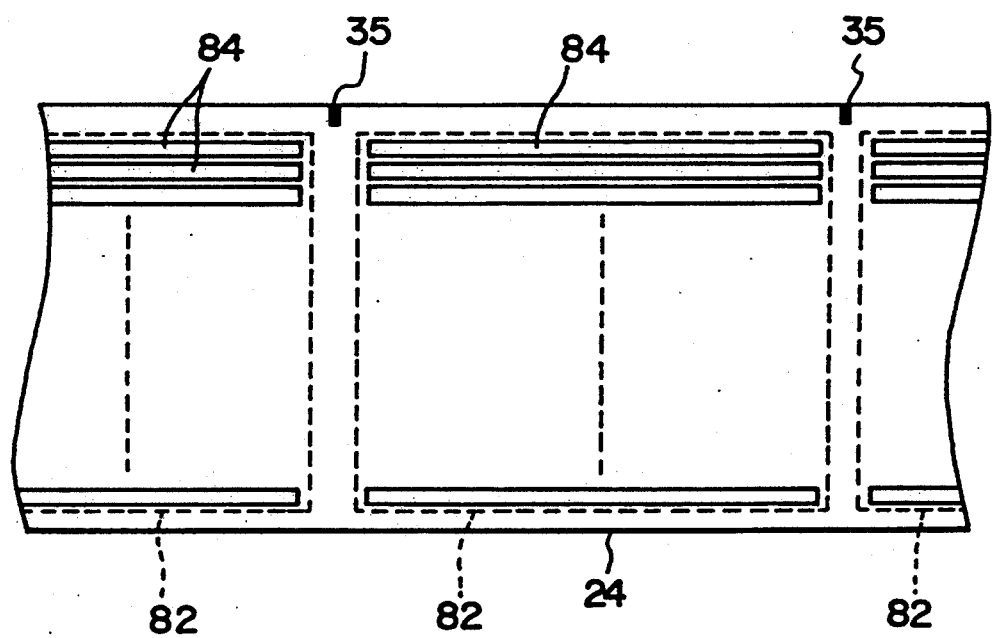
FIG. 5 is a schematic view illustrating a magnetic recording portion of a photographic paper.

Disposed downstream of the conveying direction relative to the printing position of the photographic paper 24 is a write head 80 connected to the control circuit 33. The photographic paper 24 has a magnetic material applied to the surface opposite to the surface on which an emulsifier layer is formed and, as shown in FIG. 5, the sites corresponding to a site at which the image is recorded are each defined to be a magnetic recording portion 82 of the photographic paper 24. The magnetic recording portion 82 has a plurality of magnetic tracks 84 provided in the conveying direction of the photographic paper 24 and, on each of the magnetic tracks 84, different information about the corresponding image, for example, the frame number, identity of the customer, printing condition, correction information for correcting the printing condition and the like are recorded. The above-described write head 80 is disposed so as to correspond to the magnetic recording portion 82 with the photographic paper 24 conveyed, and writes the information entered from the control circuit 33 onto the magnetic track 84.

In addition, downstream of the conveying direction of the photographic paper 24 relative to the write head 80, a cut marker 34 is disposed. The cut marker 34, as shown in FIG. 5, applies a cut mark 35 for each gap of the image frame of the photographic paper 24 after the printing operation.

A read head 88 of a read unit 86 is connected to the control circuit 33. The read unit 86 comprises a plurality of conveying rollers 90 for conveying the photographic paper 24. The read head 88 is disposed so as to correspond to the magnetic recording portion 82 of the photographic paper 24 with the photographic paper 24 conveyed by the pair of conveying rollers 90, and reads the information recorded within each magnetic track to output the information to the control circuit 33.

Meanwhile, the photographic paper 24 on which the image is printed by the printing unit 22 is fed to the developing unit 38. The developing unit 38 dries the photographic paper 24 after it is developed, fixed and rinsed by immersion into within each treating solution. The photographic paper 24 which has been treated in the developing unit is fed to a matching unit 39. In addition, the negative film 12 is also fed to the matching unit 39.

Figure 3:
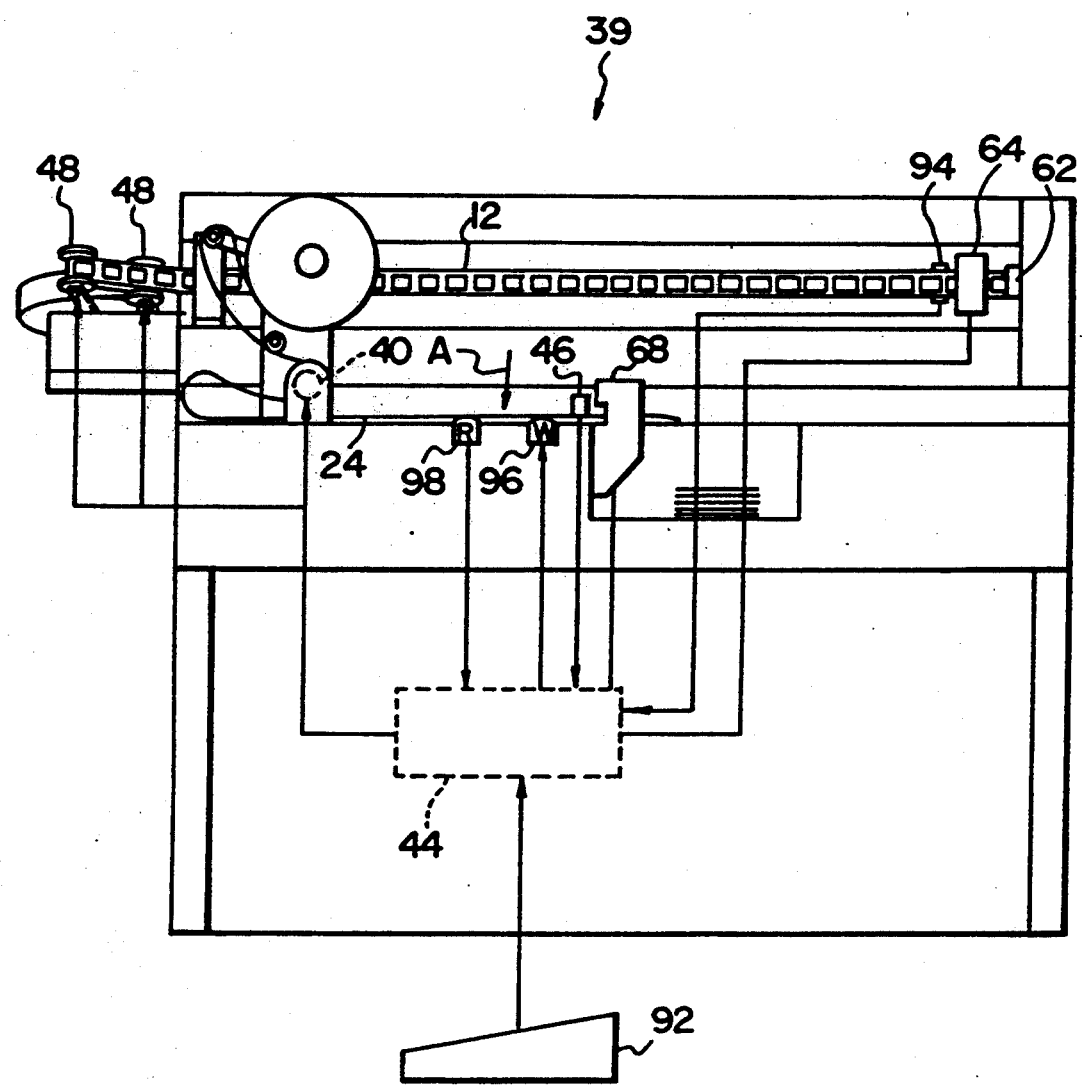
FIG. 3 is a schematic view illustrating the arrangement of a matching unit.

The matching unit 39 comprises a plurality of conveying rollers 40 for conveying the photographic paper 24, by which the photographic paper 24 is conveyed up to an inspecting position indicated by arrow A of FIG. 3. At this time, the photographic paper 24 is conveyed guided so that the surface on which the image is recorded may face upwardly. A keyboard 92 is connected to the control circuit 44 of the matching unit 39. The inspector checks the workmanship of the image which lies at the inspecting position and determines whether reprinting is necessary or not. If it is determined that the reprinting is necessary, a correction information for correcting the printing condition is entered by the keyboard 92.

In addition, at the matching unit 39, a plurality of conveying rollers 48 for conveying the negative films 12 are disposed to convey the negative film 1 in synchronism with the photographic paper 24 conveyed by the conveying rollers 40. A read head 94 is disposed on the conveying path of the negative film 12. The read head 94 is connected to the control circuit 44 to read the information stored within the magnetic recording portion 74 of the negative film 12 to output the information to the control circuit 44.

A cartridge 62 is disposed at the terminal portion of the conveying path of the negative film 12. The top end portion of the negative film which is conveyed up to the position where the cartridge 62 is disposed is stored into the cartridge 622 by a guide means (not shown) to be fixed to a spool (not shown) disposed within the interior of the cartridge 62. Adjacent to the position where the cartridge 62 is disposed, a cutter 64 for cutting the negative film 12 is mounted. The cutter 64 is connected to the control circuit 44 and its actuation is controlled by the same.

In addition, with the photographic paper 24 conveyed, at the position corresponding to the upper surface of the photographic paper 24, a cut mark sensor 46 is disposed to be connected to the control circuit 44. The cut mark sensor 46 detects the cut mark 35 applied to the photographic paper 24 to output a corresponding signal to the control circuit 44. In addition, upstream of the conveying direction of the photographic paper 24 with respect to the inspecting position, a read head 98 is disposed while downstream of the conveying direction a write head 96 is disposed. The read head 98 and the write head 96 are connected to the control circuit 44 to read the information stored within the magnetic recording portion 82 of the photographic paper 24 to output the information to the control circuit 44 while writing the information entered from the control circuit 44 into the magnetic recording portion 82 of the photographic paper 24.

A cutter 68 for cutting the photographic paper 24 is disposed at a position spaced apart by a single image frame from the cut mark sensor 46, which lies at the terminal portion, as viewed in the conveying direction of the photographic paper 24. The cutter 68 is connected to the above-described control circuit 44 and is actuated at the time the cut mark sensor 46 has detected the cut mark, to cut the photographic paper 24 for each image frame. The cut negative film 12 and photographic paper 24 are bagged by a bagging unit 70 (see FIG. 1).

Next, the operation of this embodiment is described.

Figure 6A:
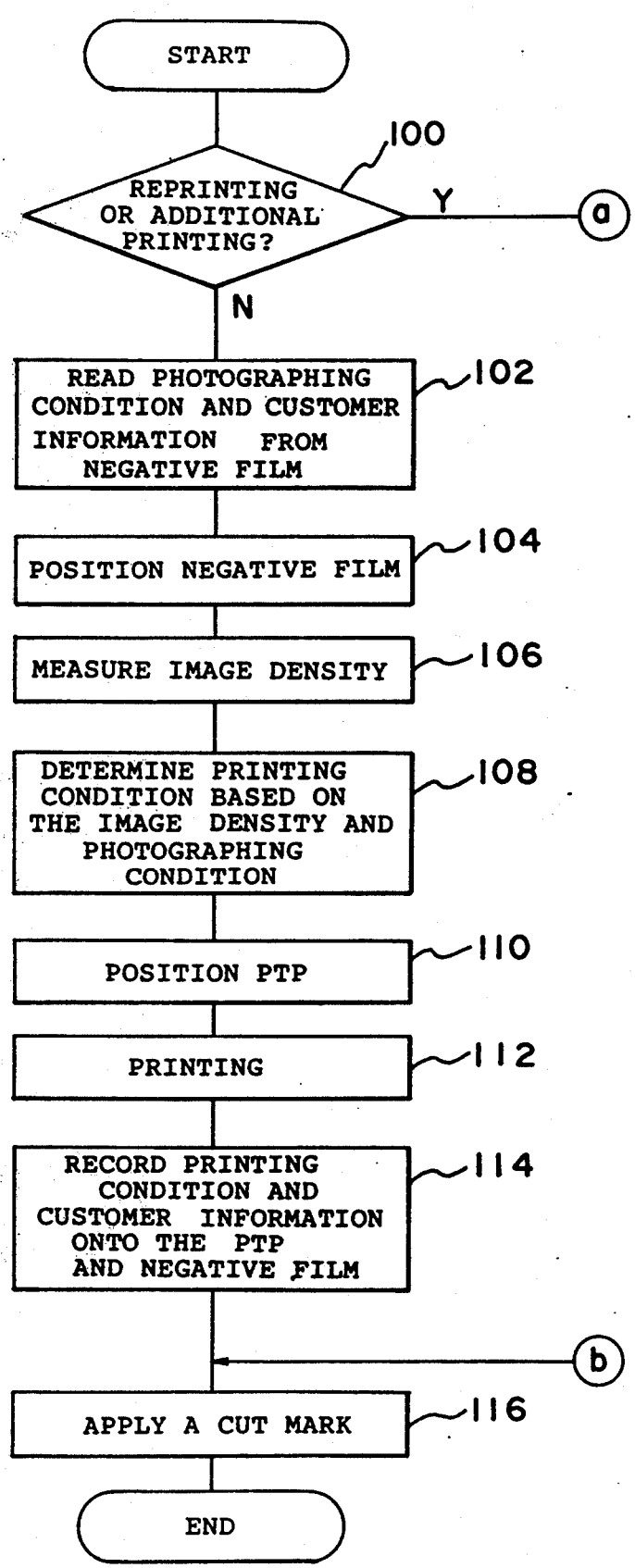
FIGS. 6A, 6B, 6C, 7A and 7B are respectively a flowchart for revealing the operation of a specific embodiment of the invention.
Figure 6B:
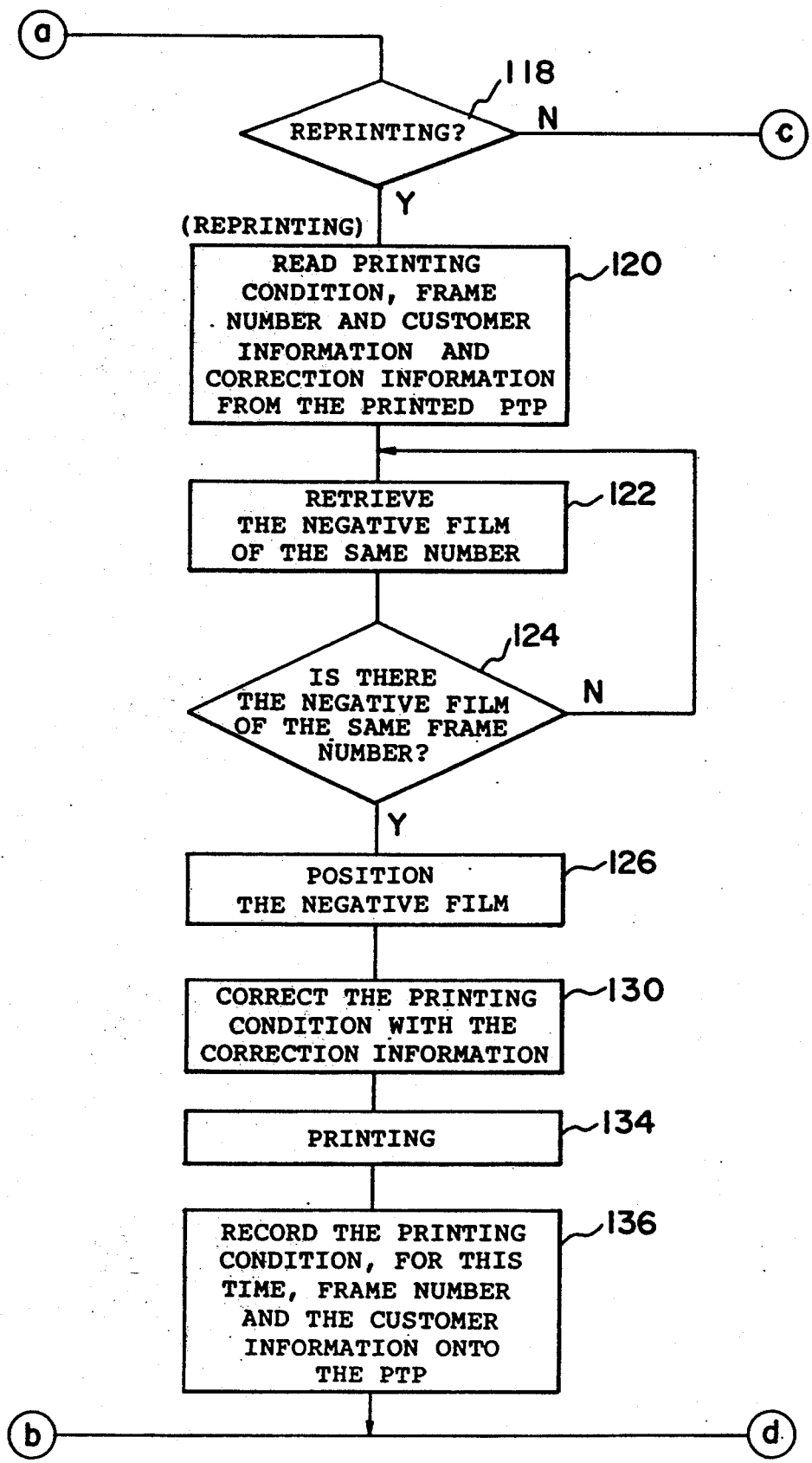
Figure 6C:
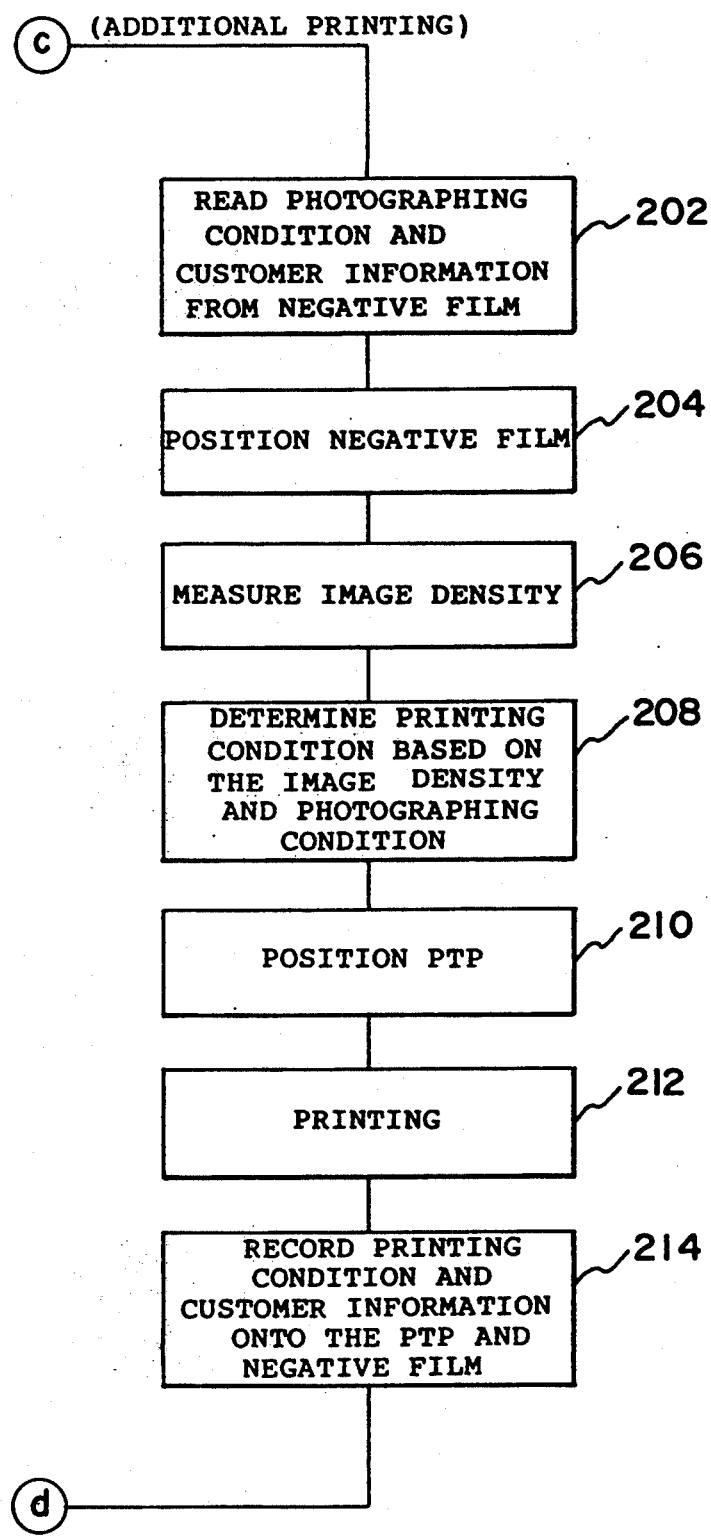

A negative film, which has been developed, fixed, rinsed and dried in the developing unit 14, is fed to the printing unit 22, where the image recorded on the negative film 12 is printed on the photographic paper 24. The operation of this printing unit 22 is described in detail with reference to a flowchart of FIGS. 6A, 6B and 6C.

In step 100, it is determined whether the reason for performing the printing operation is due to reprinting or additional printing by reordering or not. If no, then it is determined that the image recorded on the film 12 is first printed onto the photographic paper 24, and the procedure is shifted to step 102.

In step 102, the information representing the photographing condition and the customer information, which are stored within the magnetic recording portion 74 corresponding to the image 72 to be printed, among the magnetic recording portions 74 of the negative film 12, are read by the read head 78. In step 104, the image to be printed is positioned at the printing position. In step 106, the image density of the image 72 positioned to the printing position is measured by the density scanner 32.

In step 108, in accordance with the measured image density and the information representing the photographing condition, a printing condition for printing the image 72 onto the photographic paper 24 is determined. In the next step 110, the photographic paper 24 is positioned to the printing position and, in step 112, in accordance with the above-described printing condition, the optical system 26 and the filter 30 are controlled to print the image recorded on the negative film 12 onto the photographic paper 24.

In step 114, the printing condition determined in step 108 and the customer information read out in step 102 are each written onto the magnetic track 84 of the magnetic recording portion 82 corresponding to the above-described information by the write head 79 for the negative film 12 and by the write head 80 for the magnetic recording portion 74 and the photographic paper 24. In the next step 116, the cut mark 35 is applied to the photographic paper 24 by the cut marker 34 to complete the operation.

In addition, if the determination in step 100 is affirmative, then in step 118, it is determined in step 118 whether the printing operation is conditioned by the necessity of reprinting or not. If the determination in step 118 is affirmative, then the procedure is shifted to step 120. In the printing apparatus 22 according to this embodiment, the image 72 recorded on the negative film 12 is reprinted and the printed photographic paper 24, which has been determined necessary to be reprinted in the inspection process, is set to the read unit 86. In step 120, the information about the printing condition, frame number and the identity of the customer, which is stored within the magnetic recording portion 82 of the printed photographic paper 24 set to the read unit 86, is read out by the read head 88. In addition, when the reprinting is performed, a correction information for correcting the printing condition entered in the inspecting process is previously stored within the magnetic recording portion 82, which correction information is simultaneously read out.

In the next step 122, the negative film 12 is conveyed while the frame number stored within the magnetic recording portion 74 is referenced and, in step 124, it is determined whether it is identical to the frame number read out in step 120 or not. If the determination in step 124 is negative, then the procedure is returned to step 122 to repeat step 122 and step 124 until the determination in step 124 is affirmed.

If the determination in step 124 is affirmed and the magnetic recording portion 74 storing the identical frame number is retrieved, then, in step 126, the image frame corresponding to the magnetic recording portion 74 is positioned to the printing position of the negative film 12. In step 130, the printing condition read out from the above-described magnetic recording portion 82 is corrected according to the read correction information to determine a new printing condition.

In the next step 134, the printing operation is performed, as in step 112. In step 136, the printing condition for this time and the information about the frame number, identity of the customer and the like, which is read out in step 120, are written onto the corresponding magnetic track 84 of the magnetic recording portion 82 of the photographic paper 24 by the write head 79 for the negative film and by the write head 80 for the magnetic recording portion 74 and the photographic paper 24 and, in step 116, the cut mark 35 is applied to the photographic paper 24 to complete the operation. If the determination in step 118 is negated, then it is determined that the printing operation is conditioned by the necessity of reordering and, in step 202 though 214, a normal printing operation is performed as in the above-described steps 102 through 114. That is, in step 202, the photographing information and the customer information for the image to be printed, which are stored within the magnetic recording portion 74, of those for the negative film 12, are read by the read head 78. In step 204, the above-described image 72 to be printed is positioned to the printing position. In step 206, the density of the image 72 which has been positioned to the printing position is measured by means of a density scanner 32. In step 208, based on the measured image density and the photographing information, the printing condition for printing the image 72 onto the photographic paper 24 is determined. In the next step 210, the photographic paper 24 is positioned to the printing position and, in step 212, in accordance with the above-described printing condition, the optical system 26 and the filter 30 are controlled to print the image recorded on the negative film 12 onto the photographic paper 24.

In step 214, the printing condition determined in step 208 and the customer information read out in step 202 are each written onto the magnetic track 84 of the magnetic recording portion 82 corresponding to the above-described information by the write head 79 for the negative film 12 and by the write head 80 for the magnetic recording portion 74 and the photographic paper 24. In the next step 216, a cut mark 35 is applied to the photographic paper 24 by the cut marker 34 to complete the operation.

As described above, the image is printed and the photographic paper 24 on which various information is recorded is subjected to the developing, fixing, rinsing and drying operations by being respectively immersed within the treating solution in the developing unit 38. At this time, since each information is magnetically stored within the magnetic recording portion 82, even if the photographic paper 24 is immersed within the treating solution, no information will be lost.

Figure 7A:
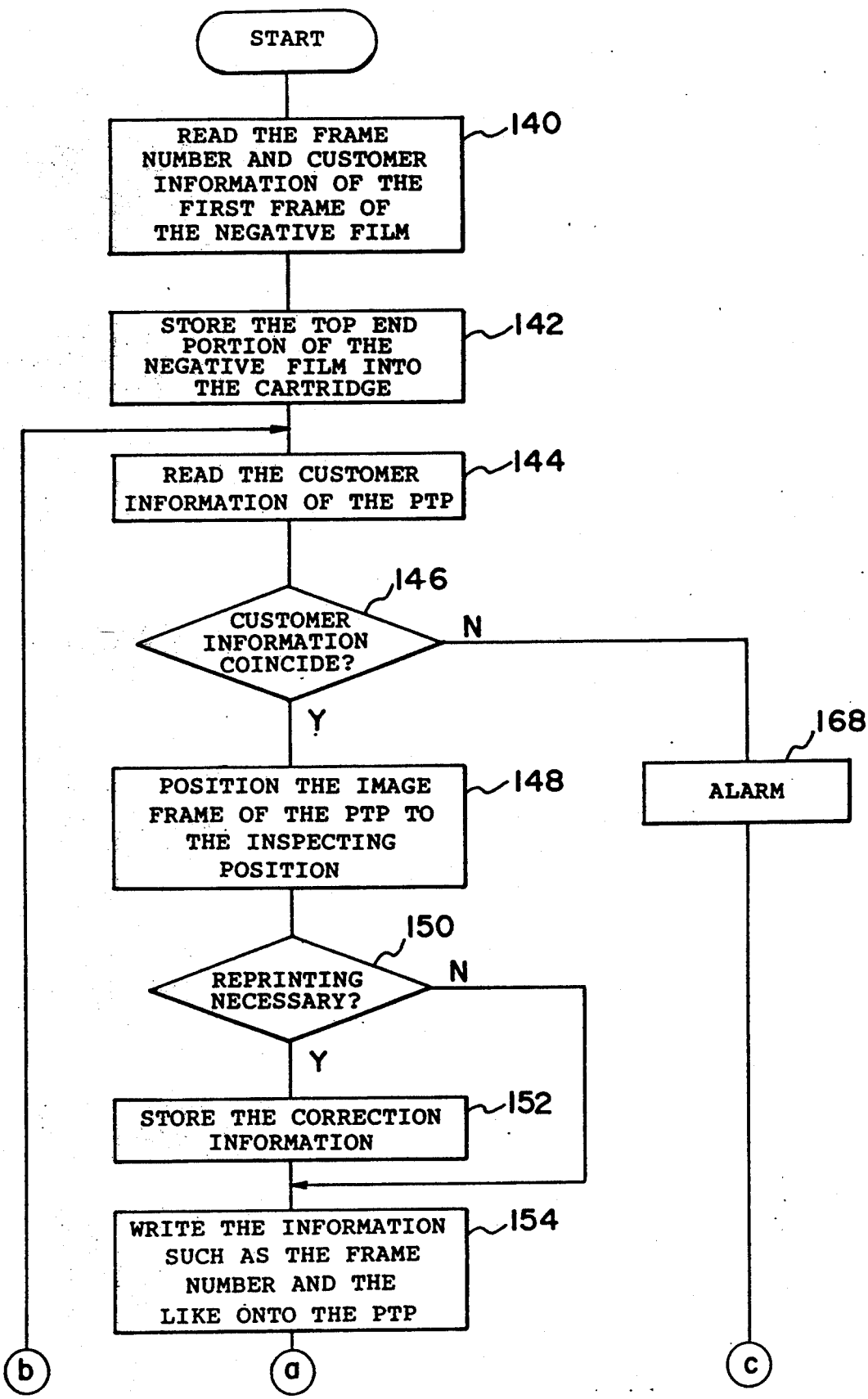
Figure 7B:
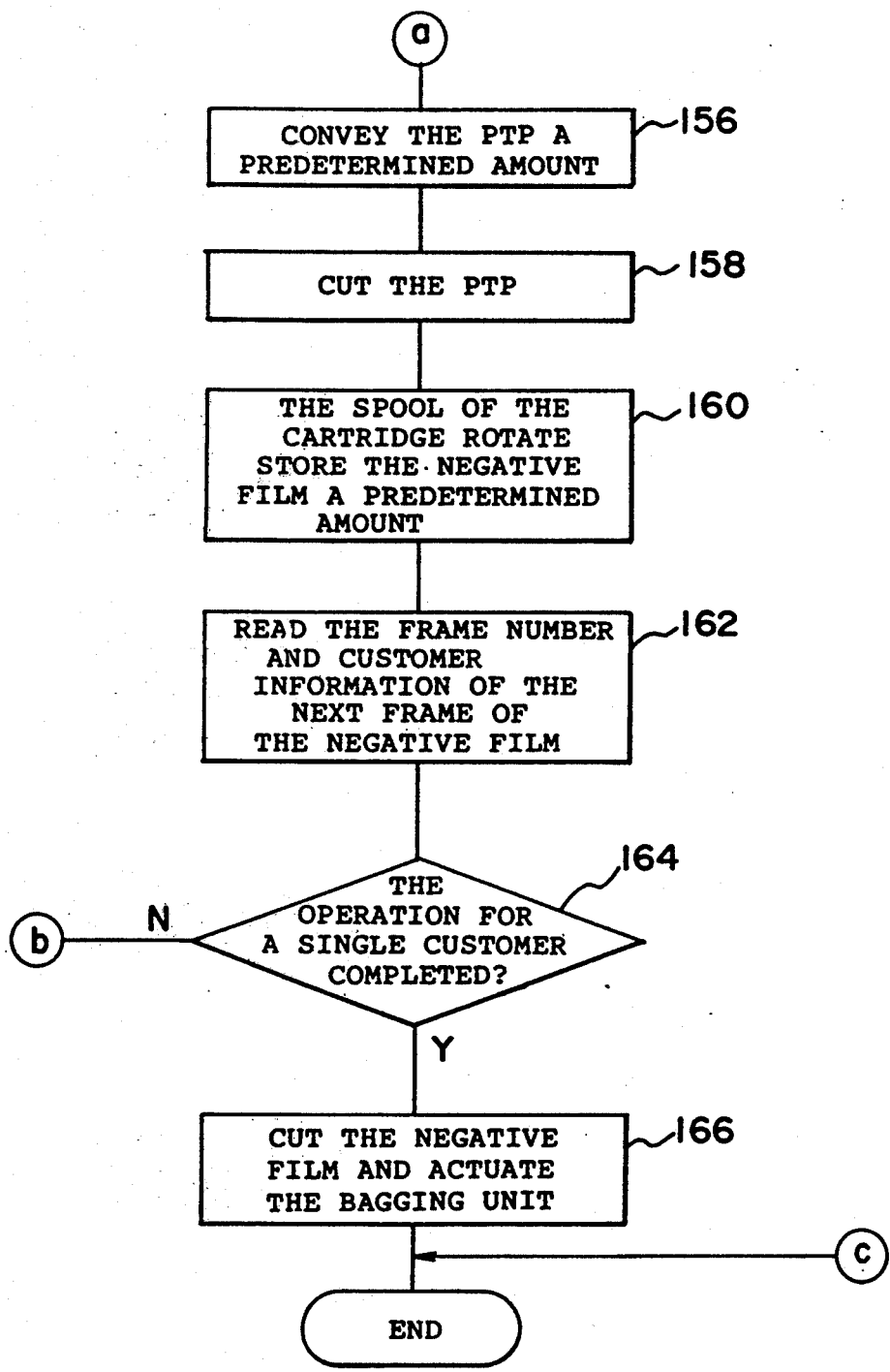

The negative film 12 and the photographic paper 24, which has been treated in the developing unit 38, are matched in the matching unit 39. The operation of this matching unit 39 is hereinafter described with reference to a flowchart of FIGS. 7A and 7B. In step 140, the frame number of the image frame and the customer information, which are recorded at the top end of the negative film 12, are read by the read head 94. In step 142, the negative film 12 is conveyed by a predetermined amount so that the top end of the negative film 12 is stored into the cartridge 62 to be fixed to the spool of the cartridge 62.

In step 144, the customer information stored within the magnetic recording portion 82 of the photographic paper 24 is read by the read head 98. In step 146, it is determined whether the customer information stored within the magnetic recording portion 82 of the photographic paper 24 and the customer information stored within the magnetic recording portion 74 of the negative film 12 coincide with each other or not. If not, then it is determined that the negative film 12 and the photographic paper 24 do not correspond and, in step 168, an alarm, which is an annunciating means, is issued to notify the operator to complete the operation.

If the determination in step 146 is affirmative, then the procedure is shifted to step 148 to convey the photographic paper 24 to position the image frame to the inspecting position. In step 150, it is determined from the data entered through the keyboard 92 by the operator whether reprinting is necessary or not. If the determination in step 150 is affirmative, then, in step 152, the correction information for correcting the printing condition entered by the inspector is stored.

In the next step 154, if it is determined by the write head 96 that reprinting is necessary on the magnetic recording portion 82 of the photographic paper 24, then the correction information is written. In step 156, the photographic paper 24 is conveyed until the cut mark sensor 46 detects the cut mark 35 of the photographic paper 24. In step 158, the cutter 68 is actuated to cut the photographic paper 24 by a single image frame. In the next step 160, the spool of the cartridge 62 is rotated by a predetermined amount to store the negative film 12 into the cartridge 62 by a predetermined amount.

In step 162, the negative film 12 is conveyed by a predetermined amount to read the frame number, customer information and the like of the next image frame of the negative film 12 by the read head 94. In step 164, the customer information read in step 162 and the previously read information are compared to determine whether the operation for a single customer is completed or not. If not, the procedure is returned to step 144, where steps 144 through 164 are repeated until the determination in step 164 is affirmed. If the determination in step 164 is affirmed, then, in step 166, the cutter 64 is actuated to cut the negative film 12, and the spool of the cartridge 62 is rotated by a predetermined amount to store the negative film 12 into the cartridge 62. Then the bagging unit 70 is actuated to complete the operation.

As described above, according to this embodiment, since the information transmitted between the processes is stored into the magnetic recording portion of the negative film 12 and the magnetic recording portion 82 of the photographic paper 24, even if the photographic paper is immersed within the treating solution in the developing units 14 and 38, no information will be lost and a post operation such as punching holes is also unnecessary since it is possible to readily transmit the information between the processes.

In addition, according to this embodiment, during the reprinting, the correction information and the frame number of the printed photographic paper 24 set to the read unit 86 are read to automatically correct the printing condition in accordance with the correction information while the image frame of the same frame number which is recorded on the negative film 12 is retrieved for reprinting. In addition, at the time of additional printing (reordering), the photographing condition stored on the magnetic recording portion 74 of the negative film 12 is read and based on this condition, the printing condition is determined for additional printing. As a result, during the above-described operations, it is not necessary to manually transmit the correction information or retrieve the image recorded on the negative film 12 resulting in eased operation.

In addition, according to this embodiment, since the information transmitted between the processes is stored and divided into the magnetic recording portion 74 of the negative film 12 and the magnetic recording portion 82 of the photographic paper 24, a degree of damage to the negative film 12 is smaller than when it the information is stored into only the magnetic recording portion 74 of the negative film 12.

Incidentally, the present invention is not necessarily restricted to the kind of information stored into the magnetic recording portion 74 of the negative film 12 and the magnetic recording portion 82 of the photographic paper 24, but can include every information concerning the image.

In addition, although, in this embodiment, the magnetic recording portion 74 and the magnetic recording portion 82 are formed by applying the magnetic material to the negative film 12 and the photographic paper 24, the present invention is not necessarily restricted to this, but the magnetic recording portion may be formed by, for example, adhering magnetic tape or the like to the negative film 12 and the photographic paper 24.

I claim:

1. A picture processing system for printing an image on a negative film onto a photographic paper to form a photographic paper image, said photographic paper having a photographic paper magnetic recording portion, and said negative film having a negative film recording portion, said image of said negative film being a negative film image, said negative film recording portion having recorded thereon information about the negative film image, said system comprising:
   write means for magnetically writing first information onto said photographic paper magnetic recording portion to store said first information therein, said first information being information about said photographic paper image;
   read means for reading said first information stored in said photographic paper magnetic recording portion; and
   processing means for performing a subsequent processing on said photographic paper in response to said first information read by said read means, said processing means including means for determining whether said photographic paper image corresponds to said negative film image.

2. A picture processing system as set forth in claim 1, wherein said processing means comprises matching means for determining whether said photographic paper image and said negative film image coincide, by utilizing said first information read by said read means.

3. A picture processing system as set forth in claim 2, further comprising annunciating means for annunciating a disagreement when it is determined by said matching means that said photographic paper image and said negative film image do not correspond to each other.

4. A picture processing system as set forth in claim 1, wherein said read means sequentially reads a plurality of first information stored in said photographic paper magnetic recording portion and said processing means comprises determining means for determining, by comparing adjacent ones of said plurality of first information, whether a picture processing for a single customer is completed.

5. A picture processing system as set forth in claim 1, wherein said processing means comprises printing means for printing an image onto a second photographic paper based on the first information read out by said read means.

6. A picture processing system as set forth in claim 1, further comprising first image information read means for reading the information recorded on said negative film magnetic recording portion, said information recorded on said negative film recording portion being second information, wherein the negative film image is printed onto said photographic paper using at least the second information read by said first image information read means.

7. A picture processing system as set forth in claim 6, further comprising density measuring means for measuring the image density of said negative film, wherein printing of the negative film image onto said photographic paper is performed based on the image density measured by said density measuring means and said second information read by said first image information read means.

8. A picture processing system as set forth in claim 6, further comprising second image information read means for reading said second information recorded on said negative film magnetic recording portion, wherein said picture processing means comprises matching means for determining, based on said second information read by said second image information read means and said first information read by said read means, whether said negative film image and said photographic paper image correspond to each other.

9. A picture processing system as set forth in claim 8, further comprising annunciating means for annunciating a disagreement when it is determined by said matching means that the negative film image and the photographic paper image do not correspond to each other.

10. A picture processing system for use with a photographic paper having a photographic paper magnetic recording portion and with a negative film containing an image and having a negative film magnetic recording portion containing information about the image on the negative film, said image on said negative film being a negative film image, said system comprising:
    first read means for reading the information recorded on said negative film magnetic recording portion, said information contained in said negative magnetic recording portion being first information;
    printing means for printing said negative film image onto said photographic paper in response to said first information read by said first read means, said image printed on said photographic paper being a photographic paper image;
    first write means for writing information containing at least information about said photographic paper image onto said photographic paper magnetic recording portion;
    second read means for reading second information, containing at least said information, stored within said photographic paper magnetic recording portion;
    third read means for reading said first information recorded on said negative film magnetic recording portion; and
    processing means for performing a subsequent operation on said photographic paper in response to said first information read by said third read means and to said second information read by said second read means, said processing means including means for determining whether said photographic paper image corresponds to said negative film image.

11. A picture processing system as set forth in claim 10, wherein said processing means comprises matching means for determining, based on said first information read by said third read means and said second information read by said second read means, whether said negative film image and said photographic paper image correspond to each other.

12. A picture processing system as set forth in claim 11, further comprising annunciating means for annunciating a disagreement when it is determined by said matching means that said negative film image and said photographic paper image do not correspond to each other.

13. A picture processing system as set forth in claim 10, wherein said second read means sequentially reads a plurality of said second information, and said picture processing means comprises determining whether means for determining the picture processing for a single customer is completed by comparing adjacent ones of said plurality of sequentially read second information.

14. A picture processing system as set forth in claim 10, further comprising second write means for writing correction information into said photographic paper magnetic recording portion, in which information containing at least said image information is stored, when reprinting is determined to be necessary, and fourth read means for reading information containing at least said information and said correction information from said photographic paper magnetic recording portion.

15. A picture processing system as set forth in claim 10, further comprising density measuring means for measuring the image density of said negative film, wherein said printing of said negative film image onto said photographic paper by the printing means is performed based on said image density measured by said density measuring means and said first information read by said first read means.

16. A picture processing system as set forth in claim 15, wherein the second information containing at least said information stored in the photographic paper magnetic recording portion includes said image density information measured by said density measuring means.

17. A picture processing system for use with a photographic paper and a negative film, said system comprising:
  means for forming a negative film image on a negative film;
  means for magnetically recording, on a negative film magnetic recording portion of said negative film, information about said negative film image, said information about said negative film image being negative film image information;
  first read means for reading said negative film image information recorded on said negative film magnetic recording portion;
  means, responsive to said negative film image information read by said first read means, for printing said negative film image onto said photographic paper to form a photographic paper image, said photographic paper containing a photographic paper magnetic recording portion;
  means for magnetically writing photographic paper image information in said photographic paper magnetic recording portion, said photographic paper image information comprising information about said photographic paper image;
  second read means for reading said photographic paper information written in said photographic paper magnetic recording portion;
  third read means for reading said negative film image information recorded on said negative film magnetic recording portion; and
  means for performing a subsequent operation on said photographic paper in response to said negative film image information read by said third read means and to said photographic paper image information read by said second read means, said subsequent operation performing means including means for comparing said photographic paper image information and said negative film image information, and means for determining whether said photographic paper image information and said negative film image information correspond to each other.

18. A method of processing pictures for use with a photographic paper and a negative film, said method comprising the steps of:
  forming a negative film image on a negative film;
  magnetically recording, in a negative film magnetic recording portion of said negative film, information about said negative film image, said information about said negative film image being negative film image information;
  reading said negative film image information recorded in said negative film magnetic recording portion;
  in response to said negative film image information being read, printing said negative film image onto said photographic paper to form a photographic paper image, said photographic paper having a photographic paper magnetic recording portion;
  magnetically recording photographic paper image information onto said photographic paper magnetic recording portion, said photographic paper image information comprising information about said photographic paper image;
  reading said photographic paper information recorded in said photographic paper magnetic recording portion;
  reading said negative film image information recorded in said negative film magnetic recording portion; and
  performing a subsequent operation with said photographic paper in response to the read image negative film image information and to the read photographic paper image information, said subsequent operation performing step including comparing said photographic paper image information and said negative film image information, and determining whether said photographic paper image information and said negative film image information correspond to each other.

* * * * *